United States Patent [19]

Meisel

[11] Patent Number: 5,653,426

[45] Date of Patent: Aug. 5, 1997

[54] SELF-CENTERING SPRING HANGER ASSEMBLY

[75] Inventor: Paul William Meisel, Worthington, Ohio

[73] Assignee: Kinetics Noise Control, Inc., Dublin, Ohio

[21] Appl. No.: 663,946

[22] Filed: Jun. 14, 1996

[51] Int. Cl.$^6$ ............................................. F16F 1/06
[52] U.S. Cl. ............................ 267/71; 267/179; 411/544
[58] Field of Search ................................. 267/33, 70–74, 267/136, 137, 168, 179, 220, 290, 291; 403/220, 221, 229; 411/155, 156, 531, 537, 544

[56] References Cited

U.S. PATENT DOCUMENTS

| | | | |
|---|---|---|---|
| 1,933,447 | 10/1933 | Peterson et al. | 403/229 |
| 2,301,701 | 11/1942 | Hendrickson | 267/71 |
| 2,375,050 | 5/1945 | Tauscher | 267/168 |
| 2,995,326 | 8/1961 | Wood | 267/71 |
| 3,084,963 | 4/1963 | Beehler | 403/226 |
| 3,148,870 | 9/1964 | Suozzo | 267/71 |
| 3,559,976 | 2/1971 | Jerz | 267/168 |

*Primary Examiner*—Robert J. Oberleitner
*Assistant Examiner*—Chris Schwartz
*Attorney, Agent, or Firm*—Thomas S. Baker, Jr.

[57] ABSTRACT

A self-centering spring hanger assembly has a housing with a top wall, a bottom wall and a central vertical wall therebetween. A coil spring adapted to receive a hanger rod is mounted on the bottom wall. A spring cap is located on the top of the spring. The spring cap has a plurality of concentric depressions adapted to receive a fastener.

2 Claims, 2 Drawing Sheets

SELF-CENTERING SPRING HANGER ASSEMBLY

FIELD OF THE INVENTION

This invention relates generally to spring hanger assemblies and more particularly to such hanger assemblies which have improved lateral stability in that they are unlikely too short. The hanger assembly contains a spring cap having concentric depressions therein which better maintain the hanger rod in a central position.

BACKGROUND OF THE INVENTION

Spring hanger assemblies currently being sold are utilized to provide a vibration dampening device for various suspended articles such as pipes, heating ducts, and other equipment which must be suspended from a structure such as a ceiling, a truss, and the like. The vibration dampening device includes a housing which through a bolt and bushing or other mechanism is affixed to the ceiling, etc. The housing contains a coiled spring at the bottom portion thereof and a spring cap thereon. A hanger rod fastened to a suspended device extends through a bore in the bottom of the housing and is attached to the spring cap by a fastener.

Heretofore, such conventional spring cap and hanger rod assemblies upon vibration of the suspended device could move laterally or off center with respect to the axis of the housing thereby causing the top of the spring to roll over to one side and the rod to engage the bottom housing bore wall. This situation is called a "short" inasmuch as free or uninhibited dampening through the spring is abated.

SUMMARY OF THE INVENTION

To attain the objectives of this invention, I provide a modified spring hanger assembly which has improved lateral stability. A spring cap contains a plurality of generally axially downward concentric depressions with each depression capable of receiving a different size fastener such as a washer and/or nut. The concentric depressions serve to resist lateral movement of the fastener. If, due in part to an off-center load being applied to the fastener by a suspended object via the hanger rod, the fastener is laterally moved out of its concentric depression it tends to be self-centering and to return to a central position in the spring cap.

DETAILED DESCRIPTION OF THE INVENTION

Figure 3:
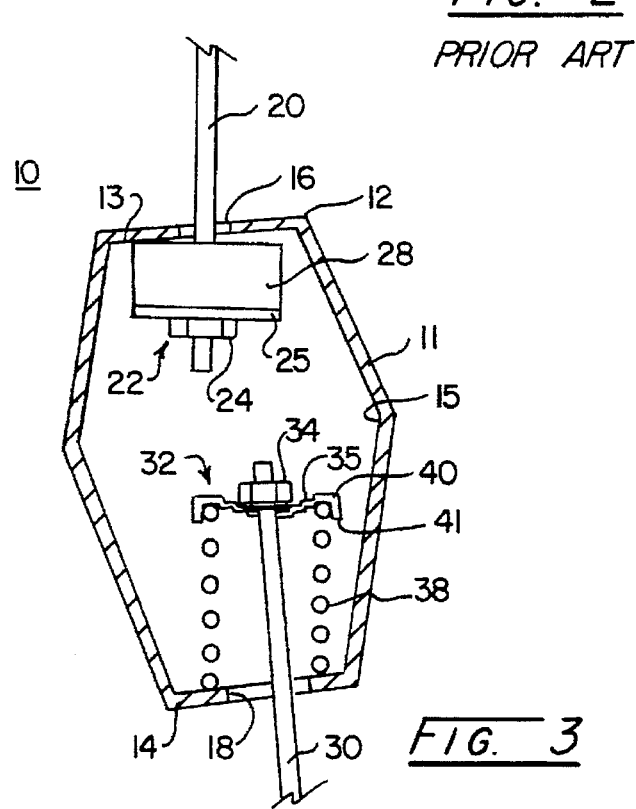
FIG. 3 is a cross-sectional side elevation view of a spring hanger assembly of the present invention during a vibration, but due to a self-centering spring cap mechanism, the lower suspension rod fastener remains centered in the spring cap and the rod does not short against the bottom housing bore.
Figure 4:
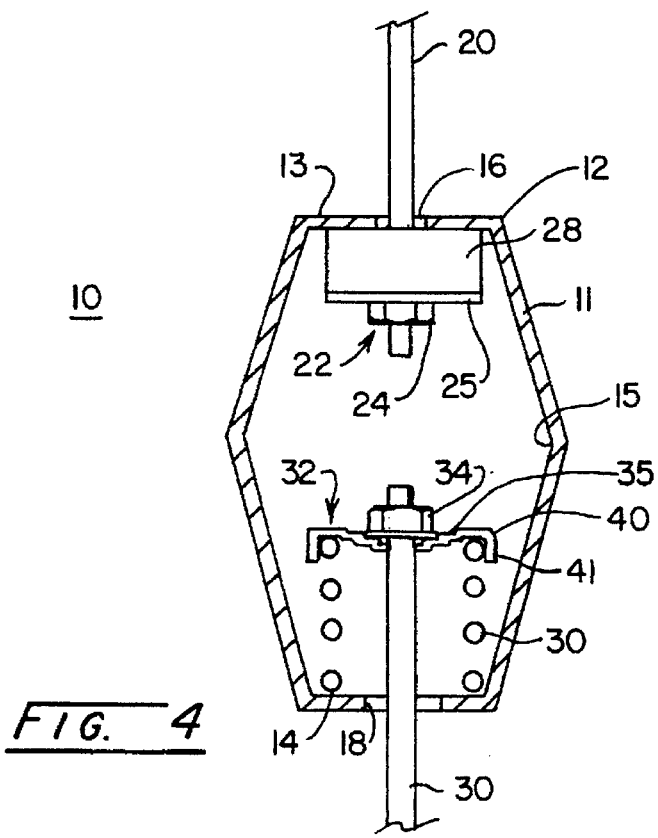
FIG. 4 is a view similar to FIG. 3 after the vibration incident showing that the lower suspension rod fastener centered within the concentric depression spring cap and within the bottom housing bore subsequent to the vibration.

Referring to the present invention and specifically to FIGS. 3 and 4, the spring hanger assembly of the present invention is generally indicated by the numeral 10. The hanger assembly has a housing 12 which may be of any size or shape to adequately house the components contained therein and desirably has a generally vertical wall component 11 which merges into a top wall 13 at one end and a bottom wall 14 at the other end. The central portion 15 of wall 11 may extend laterally beyond the top and bottom walls 13 and 14. The top and bottom walls 13 and 14 each have a bore 16 and 18 formed therein for receiving a suspension rod. These bores have a suitable diameter to accommodate different sized suspension rods. Also, it is desirable that bottom bore 18 have an enlarged diameter such that the suspension rod contained therein may swing approximately 30 degrees laterally before contacting the bore wall. As shown in the drawings, top and bottom bores 16 and 18, respectively, are axially aligned with each other in a vertical direction and desirably are laterally centered within the housing 12.

An upper suspension rod 20 extends through bore 16 of top wall 13 and is secured in any conventional manner to a ceiling, a truss, or other structure. Within housing 12, upper suspension rod 20 mounts a fastener assembly 22 which, for example, may be a nut 24 and a washer 25. The fastener assembly 22 secures a somewhat resilient bushing 28 adjacent the inner surface of top wall 13. The bushing may be constructed of any suitable material so long as it is somewhat resilient and tends to dampen vertical movement of spring housing 12. Suitable materials generally include rubbers such as natural rubber, copolymers of styrene and butadiene monomers, EPDM (ethylene-propylene-diene) rubber, and the like.

Figure 5:
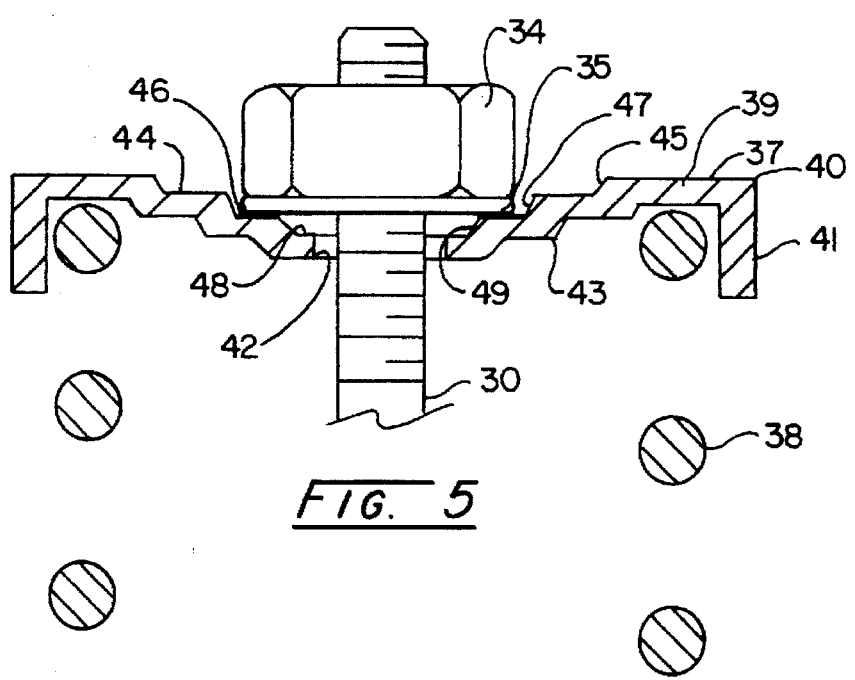
FIG. 5 is an enlarged cross-sectional view of the upper portion of a coil spring and shows the self-centering spring cap of the present invention.

A lower suspension rod 30 extends through bore 18 of bottom wall 14 and is connected at its lower end in conventional fashion to a supported item such as a pipe, a heating duct, or other equipment, not shown. The lower suspension rod 30 within hanger housing 12 mounts a fastener assembly 32 which as best seen in FIG. 5, may be a nut 34 and a washer 35. The fastener assembly 32 engages a spring cap 40 which in turn rests on a coil spring 38 which resides in the bottom portion of housing 12 with the bottom of the coil spring bearing against the inner surface of housing bottom wall 14. The diameter of the coil spring is such that it is generally greater than the diameter of bottom bore 18.

Turning to FIG. 5, it may be seen that spring cap 40 has a generally circular horizontal top wall 39 having top and bottom surfaces 37 and 43 bordered by a vertically downwardly extending side skirt or wall 41. Side wall 41 serves to overlie or enclose the upper end of coil spring 38 to securely mount cap 40 thereon. Spring cap 40 has central bore 42 through which lower suspension rod 30 extends. The diameter of spring cap bore 42 is sufficient to accommodate different sized rods. An important aspect of the present invention is that the top surface 37 of top wall 39 of spring cap 40 has a plurality of spaced axially centered and successively smaller diameter concentric circular depressions configured to accept different sized conventional washers used in fastener assemblies 32. In the embodiment shown in FIG. 5, the spring cap has a first axial depression 44, a second axial depression 46 which is smaller in diameter and located axially downward from the first depression 44, and a third axial depression 48 which is smaller in diameter and located axially downward from second depression 46. Each of the concentric depressions 44, 46 and 48 has a corresponding sidewall, i.e., 45, 47 and 49, which limits lateral movement of fastener assembly 32 therein. Thus, as shown in FIG. 5, the washer of fastener assembly 32 is located in the second axial depression 46. The washer 35 is of a conventional size and lateral movement is limited or defined by depression sidewall 47.

The size relationship of the fastener component such as washer 35 with respect to the diameter of its axial depression may vary depending upon the desired end result. For example, there may be some lateral leeway or play between a fastener washer and the axial depression wall 47 as shown in FIG. 5. Alternatively, the size of the fastener may be in close tolerance with the axial depression diameter. If desired, the fastener can matingly engage the axial depression sidewall such that there is essentially no lateral movement whatsoever. Due to the stepped or indented nature of spring cap 40, lateral stability of the lower spring hanger assembly is improved greatly since lateral movement of fastener assembly 32 is generally resisted and/or prevented by the depression sidewalls 45, 47, 49. The tension or downward force exerted on lower suspension rod 30 by a suspended item or article and the upward tension force exerted by spring 38 on spring cap 40 generally retains the washer 35 of fastener assembly 32 within the spring cap 46 during a vibration of the suspended article and the washer does not vertically pop out of a particular spring cap concentric depression to cause the fastener assembly 32 to move off center.

The utilization and operation of the spring hanger assembly 10 of the present invention is as follows. Upper suspension rod 20, containing fastener assembly 22 and resilient bushing 28, is inserted through bore 16 of top wall 13 such that the bushing engages the inner surface of top wall 13. Thereafter upper suspension rod 20 is conventionally connected to any ceiling support, structure, etc. Lower suspension rod 30, coil spring 38 and spring cap 40 are inserted into the housing 12 through an opening in side wall component 11 with the rod extending through the bore 18 of housing bottom wall 14. The lower portion of lower suspension rod 30 is then fastened to an article to be suspended such as a pipe, a heating duct, etc. The washer 35 of fastener assembly 32 at the top end of rod 30 is sized such that it resides within one of the axial depressions 44, 46, 48 of spring cap 40.

Figure 1:
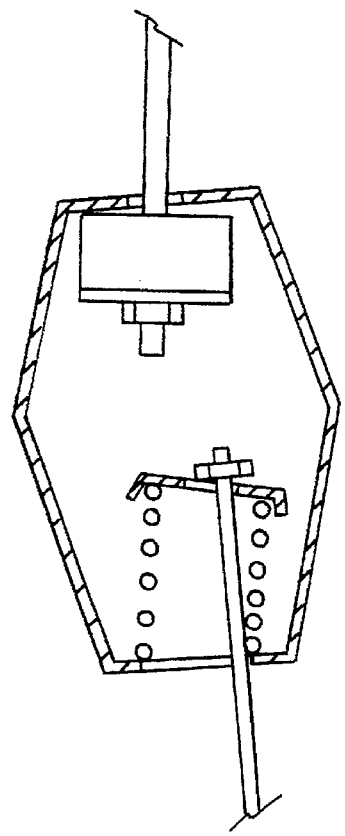
FIG. 1 is a cross-sectional side elevation view of a prior art spring hanger assembly during a vibration in which the upper housing wall is not horizontally aligned with a bushing and in which a lower suspension rod is off center.
Figure 2:
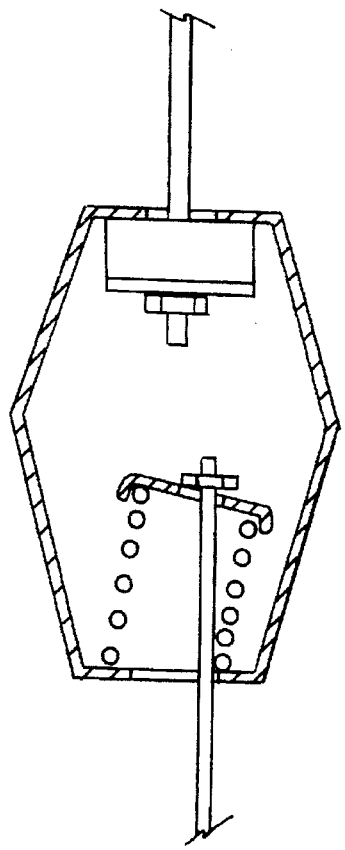
FIG. 2 is a similar view of FIG. 1 showing the spring hanger assembly after the vibration has occurred wherein the upper bracket is horizontally aligned with the bushing but wherein the lower suspension rod is in a short position and the fastener in the spring cap is off center.

Upon the occurrence of a vibration such as an earthquake, resilient bushing 28 serves to dampen some vibration and to return housing from a non-vertical position as shown in FIG. 3 to a vertical position as shown in FIG. 4. Such also occurs with a prior art hanger assembly depicted in FIGS. 1 and 2. During the vibration, the suspended article will generally vibrate in a vertical direction as well as in a horizontal direction. Coil spring 38 will dampen the vertical undulations. Due to the upward force exerted by spring 38 and the downward force exerted by the weight of the suspended hanger, the washer 35 of fastener assembly 32 is pulled downwardly into one of said concentric depressions 46 of spring cap 40. Moreover, the wall 47 defining the axial depression 46 prevents lateral movement of the fastener assembly 32 with respect to the central axis of the spring cap 40. This prevents shorting of the lower suspension rod 30 which occurs with prior art spring caps as shown in FIG. 2.

Should for some reason the lower fastener assembly 32 during the vibration incident be moved upwardly and laterally outward of its respective axial depression, due to the above-noted forces, it often will automatically return or self seat itself within its original axial depression. In other words, the device is self-centering. If, for some reason, it is not fully returned to its original axial depression, a slight blow to the fastener will again center the fastener within the spring cap. It should be apparent that the self-centering, laterally stable spring hanger assembly of the present invention has many advantages over the prior art embodiments shown in FIGS. 1 and 2.

While in accordance with the Patent Statutes, the best mode and preferred embodiment has been set forth, the scope of the invention is not limited thereto, but rather by the scope of the attached claims.

I claim my invention as follows:

1. A spring hanger assembly having improved lateral stability, comprising:

a housing having a bottom wall, a top wall, and a vertical wall element therebetween;

a bore formed in said bottom wall;

a coil spring having first and second ends and a central axis mounted in said housing and said first end engaging said bottom wall;

a spring cap defined by a generally horizontal wall having a central bore and top and bottom surfaces;

wherein said bottom surface of said spring cap engages said second end of said coil spring;

a plurality of spaced concentric depressions each defined by a generally vertical wall formed in said horizontal wall of said spring cap;

a rod which extends downwardly successively through said central bore formed in said spring cap, through said coil spring and through said bore formed in said bottom wall of said housing and a generally flat washer affixed to one end of said rod which is received in one of said spaced concentric depressions to cause said rod to tend to remain centered in said coil spring and with respect to said bottom wall bore during movement of said housing; and wherein said spring cap is spaced from said housing vertical wall element and said spring cap central bore and said bottom wall bore have a substantially greater diameter than said rod to accommodate several different rod washer combinations and to enable said rod to become angled by at least approximately 30 degrees with respect to the central axis of said coil spring and spring cap.

2. The spring hanger assembly of claim 1, wherein said concentric depressions extend axially downwardly and are successively smaller in size.

* * * * *